Nov. 9, 1965 F. E. STUART 3,216,575
APPARATUS FOR WASHING FILTER BEDS
Filed March 8, 1961 2 Sheets-Sheet 1

*INVENTOR.*
FRED E. STUART
BY
*Toulmin & Toulmin*
ATTORNEYS

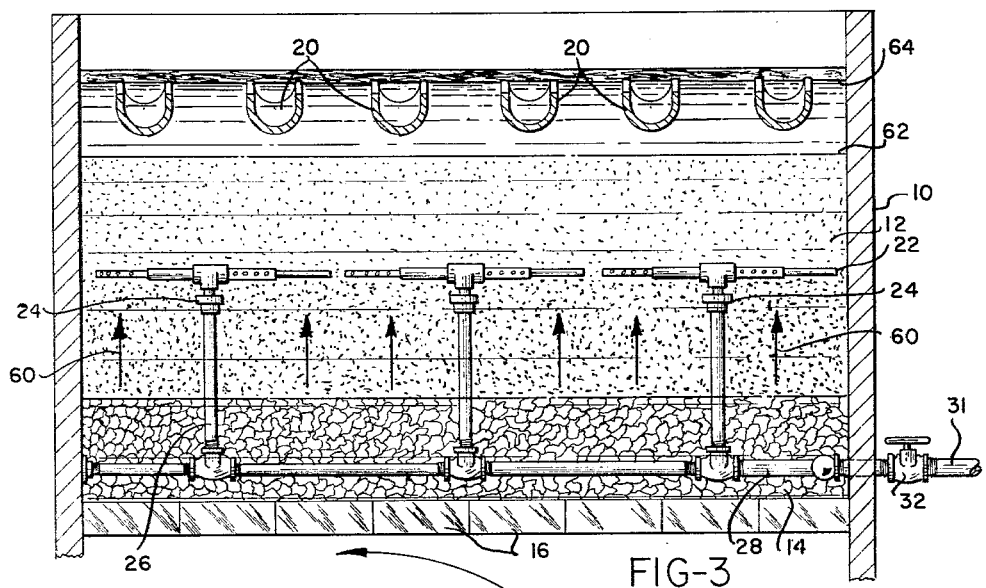
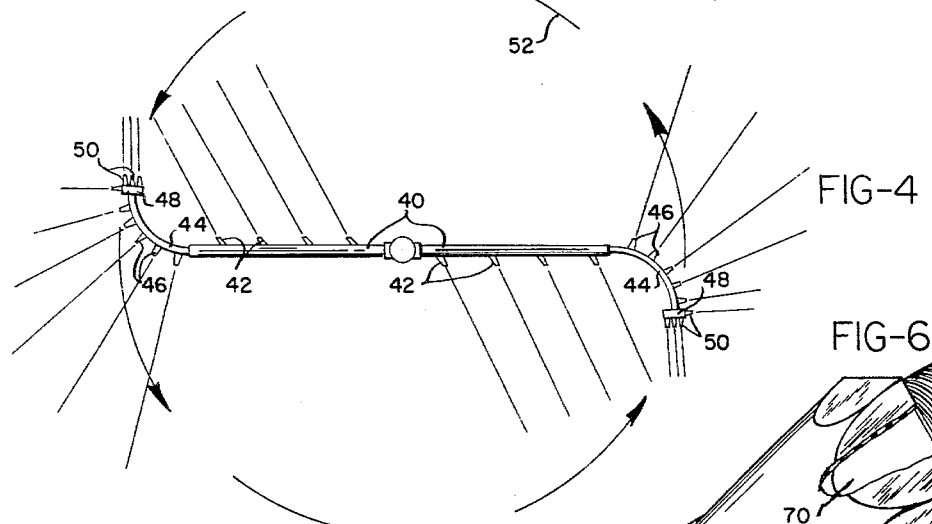
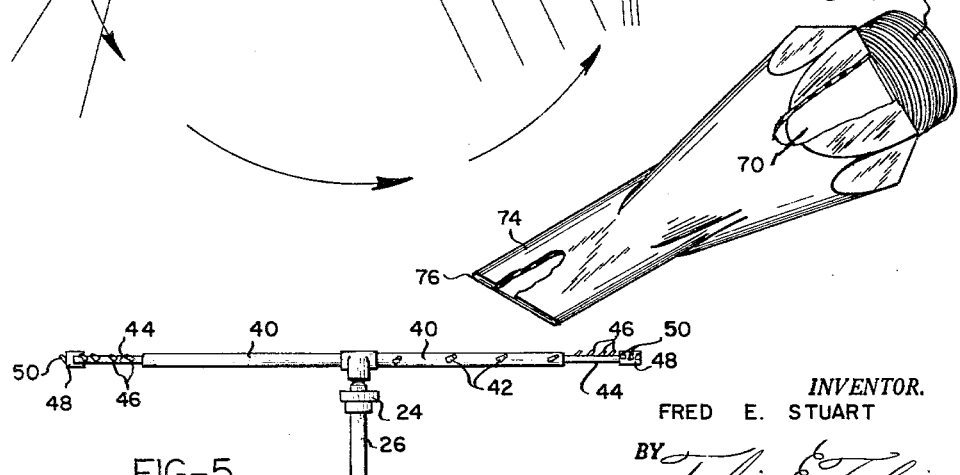
INVENTOR.
FRED E. STUART

United States Patent Office 3,216,575
Patented Nov. 9, 1965

3,216,575
APPARATUS FOR WASHING FILTER BEDS
Fred E. Stuart, Baltimore, Md., assignor to Stuart Corporation, Baltimore, Md., a corporation of Maryland
Filed Mar. 8, 1961, Ser. No. 94,324
1 Claim. (Cl. 210—280)

This invention relates to filtering equipment and is particularly concerned with a novel apparatus for washing filter beds.

Filters of the sand type, although other particulate material besides sand can be employed for the beds, are known and operate by passing the liquid, usually water, through the filter bed whereupon the undesirable materials are retained by the filter bed. Such filtered out materials include fine silt and the like which it is desired to remove from the water.

For many years, backwashing of filters of this nature has been accomplished by washing the surface of the filter bed, preferably with some agitation thereof, so that at least the upper portion of the body of sand or other particulate material making the filter bed is washed.

Arrangements of this nature, and which include rotary spray heads, are operable for breaking up the mud balls which form in filter beds of this nature and for agitating and washing about the upper four inches of the filter bed and which four inches is about that portion of the filter bed in which the foreign material extracted from the water being filtered is retained.

Recent developments in improved flocculation agents and improved flocculating devices have increased the floc penetration into the filter bed to about ten inches. This increase in penetration is also due to the increased flow rates of water through the filter bed.

On account of this increased penetration of the floc into the filter bed, the usual type rotary washer disposed above the filter bed is unsatisfactory for completely cleaning the filter bed during a backwashing operation.

Having the foregoing in mind, it is a primary object of the present invention to provide a washing device for filter beds, such as sand beds or the like, which is effective for washing and agitating the filter bed to a depth sufficient to dislodge the most deeply penetrated floc or foreign materials thereby to enhance the efficiency of the backwashing operation on the filter bed.

Another object of this invention is the provision of a rotary filter bed washer which tends to prevent any penetration of foreign material or floc into the filter bed when the filter bed is agitated by the washing system.

Still another object of this invention is the provision of a rotary jet type sand washer for use beneath the surface of the filter bed in a filter operable for agitating and scouring the particulate material in the filter bed during a backwashing operation in which the washer includes nozzles so constructed and arranged to prevent the entrance therein of any of the particulate material of the filter bed.

Another object of this invention is the provision of a washing system for the particulate material of a filter bed which is more conserving of water than heretofore known systems.

A still further object of this invention is an apparatus for washing filter beds which washes the beds more thoroughly than heretofore known arrangements thereby providing for cleaner and better tasting water.

A still further object of this invention is the provision of an apparatus for washing filter beds which is capable of removing calcuim carbonate from lime-soda softening plant filters.

It is also an object of this invention to provide an arrangement in which all of the bed washing equipment is concealed and submerged thereby eliminating corrosion and maintenance that is required where these elements are positioned above the water.

These and other objects and advantages of this invention will become more apparent upon reference to the following specification, taken in connection with the accompanying drawings in which:

FIGURE 3 is a view like FIGURE 1 but shows the filter during a backwashing operation;

FIGURE 4 is a plan view looking down on top of one of the rotary agitators and wash units and drawn at somewhat enlarged scale;

FIGURE 5 is a side view of the rotary agitator and wash unit;

FIGURE 6 is a perspective view of one type of nozzle that could be employed with the rotary agitator for preventing any particulate material from entering the nozzles.

Figure 1:
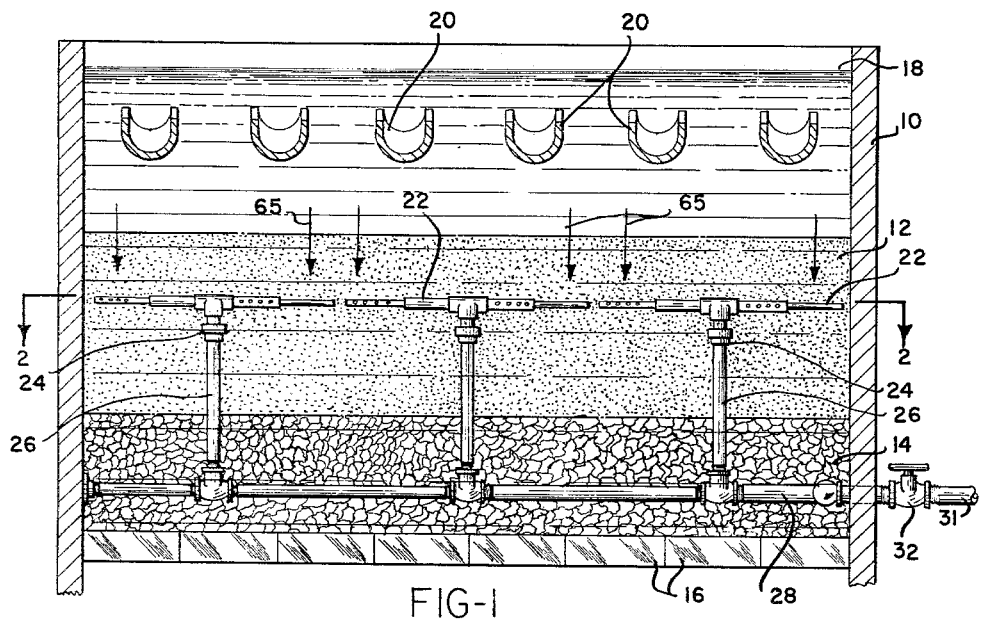
FIGURE 1 is a sectional view through a filter having a washing arrangement according to this invention, FIGURE 1 being a section indicated by line 1—1 on FIGURE 2.

Referring to the drawings somewhat more in detail, in FIGURE 1 there is shown a filter installation comprising an outer wall portion 10 in which there is located a bed 12 of particulate material, such as sand or the like, that is supported on a gravel layer 14 that, in turn, may be supported on blocks 16 or the like through which the filtered water passes in leaving the filter. The water supplied to the filter enters the top, as by passing over a breast wall or the like, and during normal filtering operations, the level of the water in the filter is at 18 while the level of the filter bed 12 is as illustrated in FIGURE 1.

Extending across the filter unit are the overflow troughs 20 inclined slightly downwardly toward one side and preferably extending through the breast wall at their lower ends so that during a backwashing operation, scum or the like dislodged from the filter bed will pass out of the troughs and to a drain point.

Figure 2:
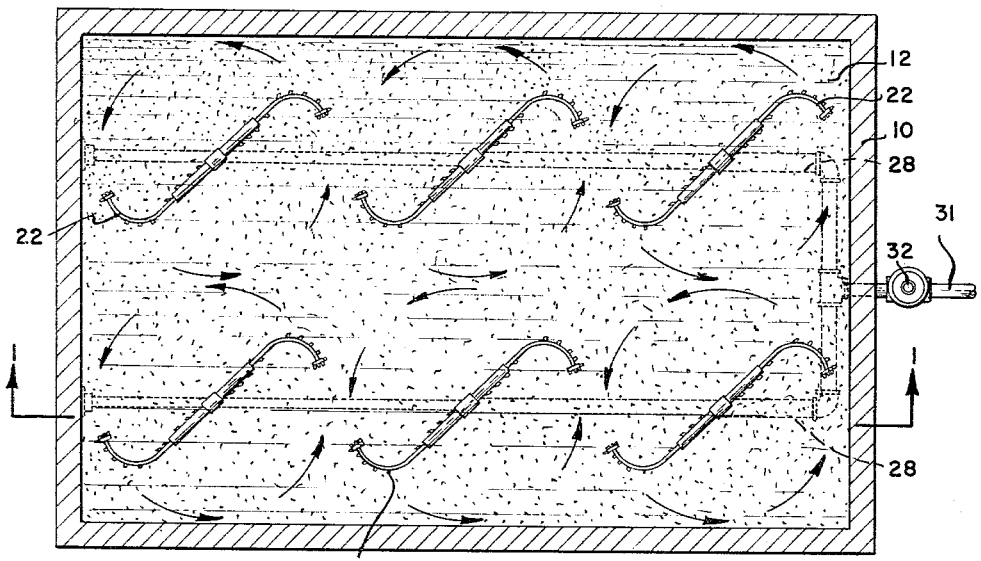
FIGURE 2 is a plan sectional view indicated by line 2—2 on FIGURE 1.

According to the present invention, the filter bed 12 is arranged for being washed by a plurality of rotary agitators 22 disposed in the filter bed about a foot beneath the surface thereof and rotatably supported, as by the rotary joints 24 on the upper ends of vertical conduits 26 that are connected at their lower ends with a horizontal header 28. As will be seen in FIGURE 2 of the filter illustrated, there are two rows of the rotary agitators and there are thus two of the headers 28 which are interconnected and which are adapted for being supplied with water under pressure from a supply conduit 31 by way of a control valve 32.

The agitators 22 are constructed as illustrated in FIGURES 4 and 5 wherein it will be seen that each agitator comprises the radially extending conduits 40 each of which carries a plurality of nozzles 42 which are directed angularly outwardly and upwardly from the axis of the pertaining conduit 40. It has been found that an upward angle of about 15° is satisfactory for producing the desired agitation of the filter bed while the outward angle of each nozzle is such as to provide, with the combination of agitators shown, agitation of the entire area of the filter bed.

Each conduit 40 at its outer end carries a curved conduit 44 also having nozzles 46 directed radially outwardly from the center of curvature of conduit 44 and upwardly at about the said 150° angle.

At the outer ends of the curved conduits 46, there are located the drive heads 48 having nozzles 50 which direct jets in a substantially planar direction in the plane of rotation of the agitator so that the agitator is driven in rotation in the direction of the arrows 52 when valve 32 is opened. The jets 50 can be directed somewhat upwardly also, if so desired, so that the entire jet pattern from any given rotatary agitator would be somewhat in the form of a wide angle inverted cone.

This provides complete coverage of the area of the filter bed and, since the jets have a substantial upward component of velocity, the particulate material of the filter bed is thoroughly agitated and loosened up and completely scoured clean of any foreign material, and this foreign material is driven upwardly through the filter bed toward the overflow troughs 20.

The appearance of the filter during a backwashing operation is illustrated in FIGURE 3 wherein it will be seen that the backwashing flow of water is upwardly through the filter bed as indicated by the arrows 60 while the filter bed above the rotary agitators 22 is subject to even greater fluid flow on account of the added water and agitation of the rotary filter heads. This makes the effective upper level of the filter bed in its expanded agitated condition at about 62 which is somewhat below the tops of the troughs 20.

The water level, on the other hand, stands at about the point indicated at 64 and wherein the top layer of the water, overflowing into the troughs and running off to a drain point, carries with it the floc and foreign material such as any silt from broken up mud balls or the like which is dislodged from the filter bed by the rotary agitators and the flow of backwashing water.

After a complete backwashing and rinsing operation, as described above, the flow of backwashing water is interrupted and the valve 32 is closed and the flow of water is then again drawn downwardly through the filter bed as indicated by arrow 65 in FIGURE 1.

Figure 7:
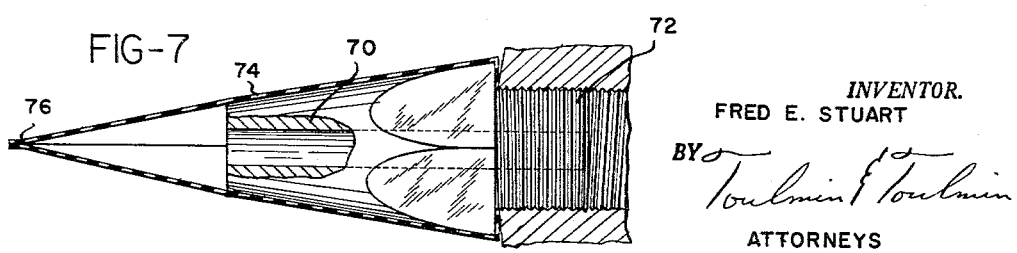
FIGURE 7 is a side view of the nozzle of FIGURE 6 partly broken away to show the construction thereof.

According to the present invention, particulate material from the filter bed is prevented from entering the nozzles of the rotary agitators by forming the nozzles as illustrated in FIGURES 6 and 7 wherein each nozzle comprises a tapering body 70 of brass or stainless steel or the like having a threaded shank 72 for threading it into a threaded socket on the rotary agitator and having a rubber-like sleeve 74 fitting over the tapered body and converging toward the outer tip 76 where the rubber sleeve flattens and closes, thus forming a check valve that prevents reverse flow into the nozzle. The rubber sleeve will readily open, however, to permit water to flow outwardly in a substantially straight line through the tapered body and the sleeve to form a jet with little if any interference by the sleeve. It will also be observed in FIGURE 7 that the rear portion of this sleeve is slipped over the rear portion of the tapered body so that it cannot be readily dislodged, even if no other securing means is used. The entire nozzle structure is made symmetrical about its longitudinal axis so that the threaded shank 72 can be screwed all the way home without changing the direction of the jet.

Inasmuch as the agitators are disposed beneath the surface of the filter bed, the several objectives referred to above with reference to improved and more rapid cleaning, and to reduced consumption of water and freedom of corrosion of the agitators is readily had.

While it is preferred for the supply headers and support conduits for the rotary agitator heads to be located beneath the filter bed, it will be evident that existing installations could be provided with rotary agitators according to the present invention by running the supply headers across the top of the filter and then running the support pipes for the rotary agitators downwardly and pivotally connecting the agitators to the lower ends thereof the required distance below the surface of the filter head.

In any case, the several advantages of the present invention and the described mode of operation thereof will prevail.

It will be understood that this invention is susceptible to modification in order to adapt it to different usages and conditions; and, accordingly, it is desired to comprehend such modifications within this invention as may fall within the scope of the appended claim.

I claim:

In combination, a filter bed and an agitator mounted to rotate therein in a horizontal plane about a vertical axis, said agitator comprising a radially extending conduit rotating in said plane and carrying a nozzle extending at an angle to the said plane of rotation of the conduit, said nozzle comprising a frusto-conical tapered body with an axial passageway therethrough of uniform diameter and having a threaded connection with said conduit, and an elastic sleeve fitted tightly over the tapered body, one end of the sleeve being folded over the base portion of the tapered body and clamped between said body and conduit while the other end of the sleeve tapers outwardly from the small end of the tapered body and is flattened to terminate in a freely contacting straight end edge portion so as to be normally closed, said body and sleeve forming a nozzle structure which during operation has a straight axial passageway therethrough which is symmetrical about its axis so that the direction of the jet will not change during the rotation of the nozzle about its threaded connection.

References Cited by the Examiner

UNITED STATES PATENTS

| | | | |
|---|---|---|---|
| 298,208 | 5/84 | Irving | 137—525.1 |
| 636,343 | 11/99 | Leineweber | 137—525.1 |
| 671,321 | 4/01 | Kinsey | 137—525.1 |
| 671,423 | 4/01 | McTernen | 239—602 X |
| 810,502 | 1/06 | Nolan et al. | 137—525.1 |
| 1,281,974 | 10/18 | Kaeding | 137—525.1 X |
| 1,930,107 | 10/33 | Rang | 137—525.1 |
| 2,244,188 | 6/41 | Danner | 210—279 |
| 2,253,600 | 8/41 | Arneson | 239—602 X |
| 2,288,565 | 6/42 | Green | 137—525.1 X |
| 2,309,916 | 2/43 | Palmer | 210—279 X |
| 2,309,917 | 2/43 | Palmer | 210—273 X |
| 2,373,555 | 4/45 | Folke | 239—534 |
| 2,382,427 | 8/45 | Langdon | 137—525.1 X |
| 2,465,628 | 3/49 | Border | 137—525.1 X |
| 2,537,585 | 1/51 | Hilkemeier | 137—525.1 X |
| 2,721,580 | 10/55 | Greer | 137—525.1 X |
| 2,890,838 | 6/59 | Jannsen | 137—525.1 X |
| 2,926,692 | 3/60 | Zillman et al. | 137—512.15 |
| 3,035,779 | 5/62 | Convis | 239—534 X |
| 3,039,612 | 6/62 | Palmer et al. | 210—280 X |

FOREIGN PATENTS 90,748    2/97    Germany.

REUBEN FRIEDMAN, *Primary Examiner.*

ROBERT F. BURNETT, HERBERT L. MARTIN,
*Examiners.*